United States Patent
Usher

[19]

[11] Patent Number: 6,071,403
[45] Date of Patent: Jun. 6, 2000

[54] POOL SKIMMER BASKET ASSEMBLY INCLUDING A BUOYANT HANDLE

[76] Inventor: Michael J. Usher, 676 Schuyler Ave., Rock Hill, S.C. 29730

[21] Appl. No.: 09/353,577

[22] Filed: Jul. 15, 1999

[51] Int. Cl.$^7$ .............................. E04H 4/16; B01D 35/02; B01D 35/05
[52] U.S. Cl. .......................... 210/169; 210/238; 210/470; 210/471; 4/496
[58] Field of Search .................................... 210/169, 237, 210/238, 242.1, 416.2, 470, 471, DIG. 9; 4/490, 496

[56] References Cited

U.S. PATENT DOCUMENTS

| | | | |
|---|---|---|---|
| 3,856,679 | 12/1974 | Jackson | 210/169 |
| 5,137,623 | 8/1992 | Wall et al. | 210/471 |
| 5,342,513 | 8/1994 | Wall et al. | 210/471 |
| 5,422,001 | 6/1995 | Yagoda et al. | 210/470 |
| 5,705,058 | 1/1998 | Fischer | 210/470 |

*Primary Examiner*—Robert J. Popovics
*Attorney, Agent, or Firm*—Adams Law Firm, P.A.

[57] ABSTRACT

A pool skimmer basket assembly is submerged in a filter passage. The filter passage communicates with a filter opening formed in a wall of a pool. The basket assembly operates to separate and capture debris entrained in pool water entering the filter opening and moving downstream through the filter passage. The skimmer basket assembly is accessible through a user access opening communicating with the filter passage, such that the skimmer basket assembly is readily removable by a user for periodic emptying and cleaning. The skimmer basket assembly includes a basket defined by walls and having an open top arranged for receiving pool water. A filter is provided for separating debris from pool water flowing downstream through the filter passage and through the open top of the basket. An extendable handle is attached to the basket for being grasped by the user to lift and remove the basket outwardly from the filter passage through the access opening. A float is attached to the extendable handle for locating the handle in a position within the filter passage for ready access by the user.

10 Claims, 6 Drawing Sheets

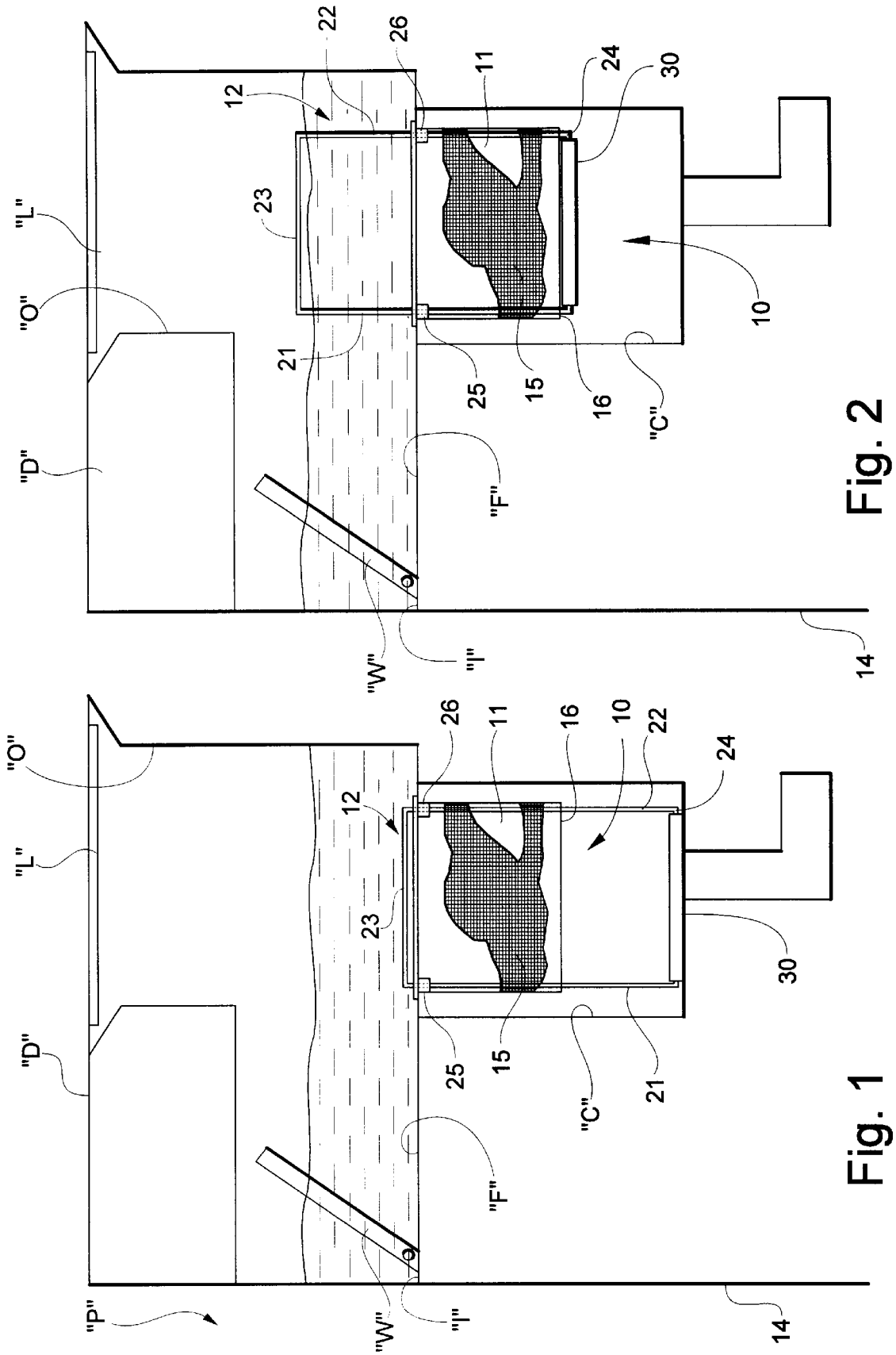

POOL SKIMMER BASKET ASSEMBLY INCLUDING A BUOYANT HANDLE

TECHNICAL FIELD AND BACKGROUND OF THE INVENTION

This invention relates to a pool skimmer basket assembly including a buoyant handle. The handle allows ready and convenient access to the basket for removal and cleaning. The invention is applicable to both in-ground and above-ground pools.

In the pool industry, much attention has been given to the problem of capturing and removing bugs, leaves, and other debris floating on the surface of the water. One common and generally effective means for combating this problem involves the use of a filter passage, or skimmer passage, formed in a side wall of the pool and having an inlet adjacent the water level. The skimmer passage communicates with a water pump which draws water from the surface of the pool through the passage inlet and through a skimmer basket where the waste debris is separated from the pool water.

The skimmer basket has a handle, an open top, a cylindrical body, and a bottom formed with the body. The body and bottom define a rigid grid-like structure with openings that allow free passage of water through the basket, while capturing debris inside the basket. A pivoted skimmer weir located at the passage inlet operates to prevent any back flow of debris into the pool.

In order to maintain its effectiveness, the skimmer basket must be periodically removed and emptied. To facilitate this, convenient access to the basket is provided through an opening formed in the surface of the pool deck. According to one prior art skimmer basket, the handle is attached at the top perimeter of the basket and extends laterally over the basket opening. Thus, in order to remove the basket, the pool cleaner must insert his hand downwardly into the debris-filled water and feel around for the handle. This can be an especially unappealing task given the variety of bugs, snakes, frogs, and other creatures that are commonly trapped in the skimmer passage.

SUMMARY OF THE INVENTION

Therefore, it is an object of the present invention to provide a pool skimmer basket assembly which includes a buoyant handle that floats to the top of the water level in the filter passage for convenient access to the pool cleaner.

It is another object of the invention to provide a pool skimmer basket assembly that can be removed and emptied by the pool cleaner without substantial contact with debris in the filter passage.

It is another object of the invention to provide a pool skimmer basket assembly with a handle that will not readily break off when removing the basket from the filter passage.

It is another object of the invention to provide a pool skimmer basket assembly with a handle that does not obstruct the flow of debris into the basket.

These and other objects of the present invention are achieved in the preferred embodiments disclosed below by providing a pool skimmer basket assembly for being submerged in a filter passage. The filter passage communicates with a filter opening formed in a wall of a pool. The basket assembly operates to separate and capture debris entrained in pool water entering the filter opening and moving downstream through the filter passage. The skimmer basket assembly is accessible through a user access opening communicating with the filter passage, such that the skimmer basket assembly is readily removable by a user periodic emptying and cleaning. The skimmer basket assembly includes a basket defined by walls and having an open top arranged for receiving pool water. Filter means is provided for separating debris from pool water flowing downstream through the filter passage and through the open top of the basket. An extendable handle means is attached to the basket for being grasped by the user to lift and remove the basket outwardly from the filter passage through the access opening. A float is attached to the extendable handle means for locating the handle means in a position within the filter passage for ready access by the user.

According to another preferred embodiment of the invention, the filter means includes one or more basket walls having a grid structure defining openings sufficient to permit passage of pool water therethrough while capturing debris entrained in the pool water.

According to another preferred embodiment of the invention, the extendable handle means is a generally U-shaped handle having a horizontal member for being grasped by the user, and first and second opposing vertical members secured to the basket.

According to another preferred embodiment of the invention, the basket includes first and second opposing sleeves for slidably receiving respective first and second vertical members of the handle. The horizontal member of the handle is thus movable relative to the basket between a lowered position adjacent the open top of the basket and a raised position spaced-apart from the open top of the basket.

According to another preferred embodiment of the invention, the first and second vertical members of the handle have respective free ends bent to form respective stopper adapted for engaging the sleeves of the basket to prevent removal of the handle from the basket.

According to another preferred embodiment of the invention, the float is attached to the horizontal member of the handle.

According to yet another preferred embodiment of the invention, the float is attached to at least one of the vertical members of the handle.

According to yet another preferred embodiment of the invention, the handle means is a handle having spaced-apart top and bottom horizontal members, and first and second spaced-apart vertical members interconnecting the horizontal members. The top horizontal member is adapted for being grasped by the user and the bottom horizontal member is adapted for engaging a bottom of the basket when the basket is lifted and removed from the filter passage.

According to yet another preferred embodiment of the invention, the basket includes first and second opposing sleeves for slidably receiving respective first and second vertical members of the handle. The top horizontal member of the handle is movable relative to the basket between a lowered position adjacent the open top of the basket and a raised position spaced-apart from the open top of the basket.

According to yet another preferred embodiment of the invention, the float is attached to the bottom horizontal member of the handle.

In another embodiment, the invention is a pool skimmer basket assembly for being submerged in a filter passage communicating with a filter opening formed in a wall of a pool. The skimmer basket assembly operates to separate and capture debris entrained in pool water entering the filter opening and moving downstream through the filter passage. The skimmer basket assembly is accessible through a user access opening communicating with the filter passage, such that the skimmer basket assembly is readily removable by a user for periodic emptying and cleaning. The skimmer basket assembly includes a basket defined by walls and having an open top arranged for receiving pool water. A filter means is provided for separating debris from pool water flowing downstream through the filter passage and through the open top of the basket. An extendable handle means is attached to the basket for being grasped by the user to lift and remove the basket outwardly from the filter passage through the access opening.

According to another preferred embodiment of the invention, a biasing means is provided for normally urging the handle means in an extended position within the filter passage for ready access by the user.

According to another preferred embodiment of the invention, the biasing means is a compression spring.

In another embodiment, the invention is a method of separating and removing debris entrained in pool water passing from a pool through a filter passage communicating with a filter opening formed in a wall of the pool. The method includes the steps of locating a pool skimmer basket in the filter passage. The basket is defined by walls and has an open top arranged for receiving pool water. The basket includes filter means for separating debris from the pool water flowing downstream through the filter passage and through the open top of the basket. An extendable handle is attached to the basket. The handle has a grip portion adapted for movement between a lowered position adjacent the open top of the basket and a raised position spaced apart from the open top of the basket. The grip portion of the extendable handle is gripped in the raised position and the basket removed outwardly from the filter passage through the access opening for emptying the captured debris from the basket.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is an elevational view of the skimmer basket immediately after the inflow of water into the filter passage, and showing the handle in the lowered position;

FIG. 2 is a further elevational view of the skimmer basket demonstrating operation of the float for elevating the grip portion of the handle to the raised position;

DESCRIPTION OF THE PREFERRED EMBODIMENT AND BEST MODE

Figure 3:
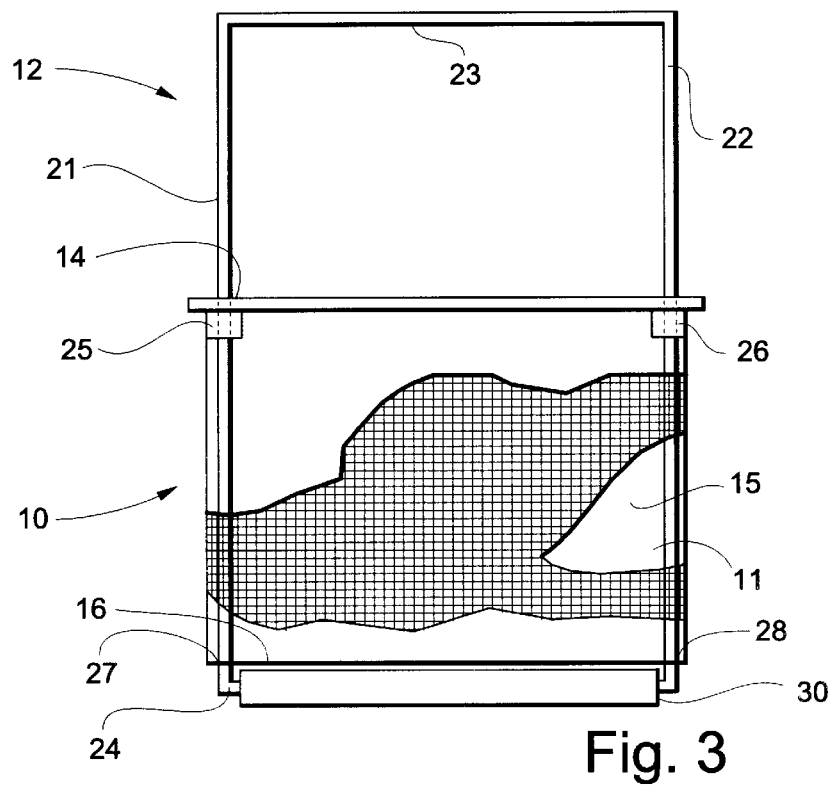
FIGS. 3 and 4 are elevational views of the skimmer basket with the grip portion of the handle in the raised and lowered position, respectively.

Referring now specifically to the drawings, a pool skimmer basket assembly according to the present invention is illustrated in FIGS. 1 and 2 and shown generally at reference numeral 10. The assembly 10 includes a skimmer basket 11 with an extendable handle 12, an open top 14, and attached side and bottom walls 15 and 16. The walls 15 and 16 form a rigid, grid-like structure defining a multiplicity of small openings. The basket 11 sits in a cylindrical cavity "C" in a filter passage "F" formed in a side wall of the pool "P". The filter passage "F" communicates with a water pump (not shown) which operates to draw pool water and debris inwardly through the filter passage "F" and into the skimmer basket 11. The grid-like structure of the basket walls 15 and 16 allows pool water to pass through the basket 11, while capturing and separating waste debris entrained in the pool water. A skimmer weir "W" located at the passage inlet "I" operates to prevent any back flow of debris into the pool "P".

Figure 4:
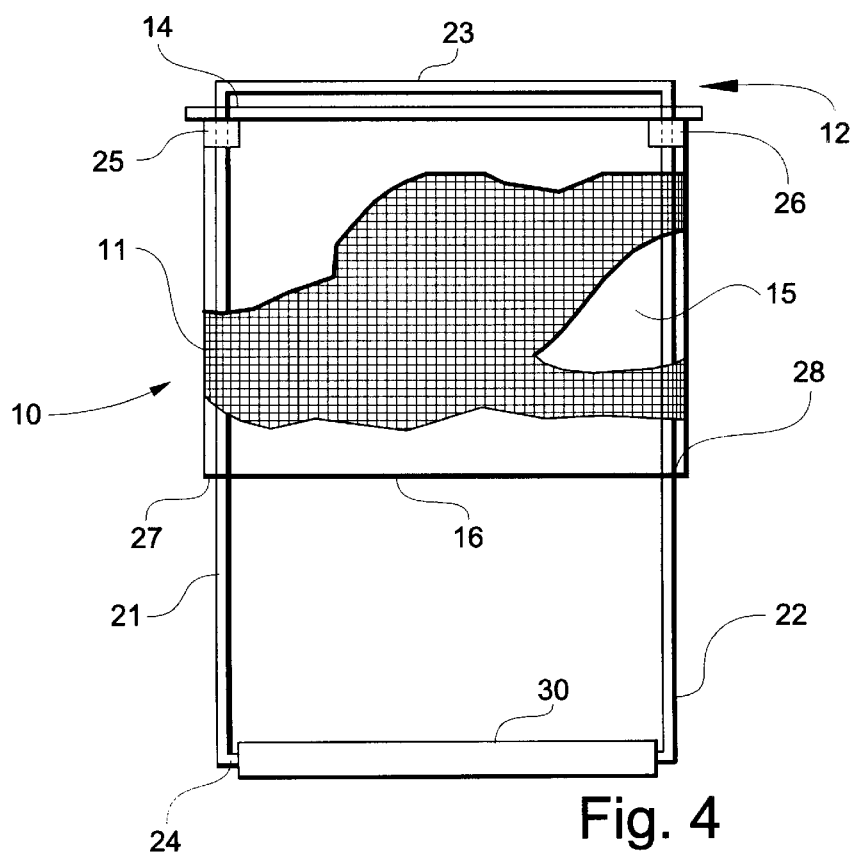

As best shown in FIGS. 3 and 4, the extendable handle 12 of the basket 11 includes a pair of spaced vertical members 21 and 22 integrally formed with top and bottom horizontal members 23 and 24. The vertical members 21 and 22 slidably extend through diametrically opposed, rigid sleeves 25 and 26 formed adjacent the open top 14 of the basket 11 and through respective openings 27 and 28 formed in the bottom wall 16. The bottom horizontal member 24 of the handle 12 carries a float 30, and serves to help support the weight of the basket 11 when lifted from the basket cavity "C" for emptying and cleaning. The top horizontal member 23 of the handle 12 defines a grip portion for being grasped by the pool cleaner. As water fills the filter passage "F" and enters the basket 11, the float 30 causes the top member 23 of the handle 12 to move upwardly from the lowered position, shown in FIGS. 1 and 4, to the raised position, shown in FIGS. 2 and 3. The float 30 is made of any suitable buoyant material, such as polystyrene or cork. The basket 11 and sleeves 25 and 26 are preferably integrally molded of a hard durable plastic, such as PVC. The handle 12 is preferably formed of stainless steel, ABS, PVC, or any suitably buoyant material.

Referring to FIGS. 1–4, to empty the basket 11, the pool cleaner removes the lid "L" from a user access opening "O" formed in the pool deck "D" and grasps the top horizontal member 23 of the handle 12 located at or above the surface of the water in the filter passage "F". The basket 11 is then removed from the basket cavity "C", emptied, cleaned, and replaced, and the lid "L" repositioned over the access opening "0".

Figure 5:
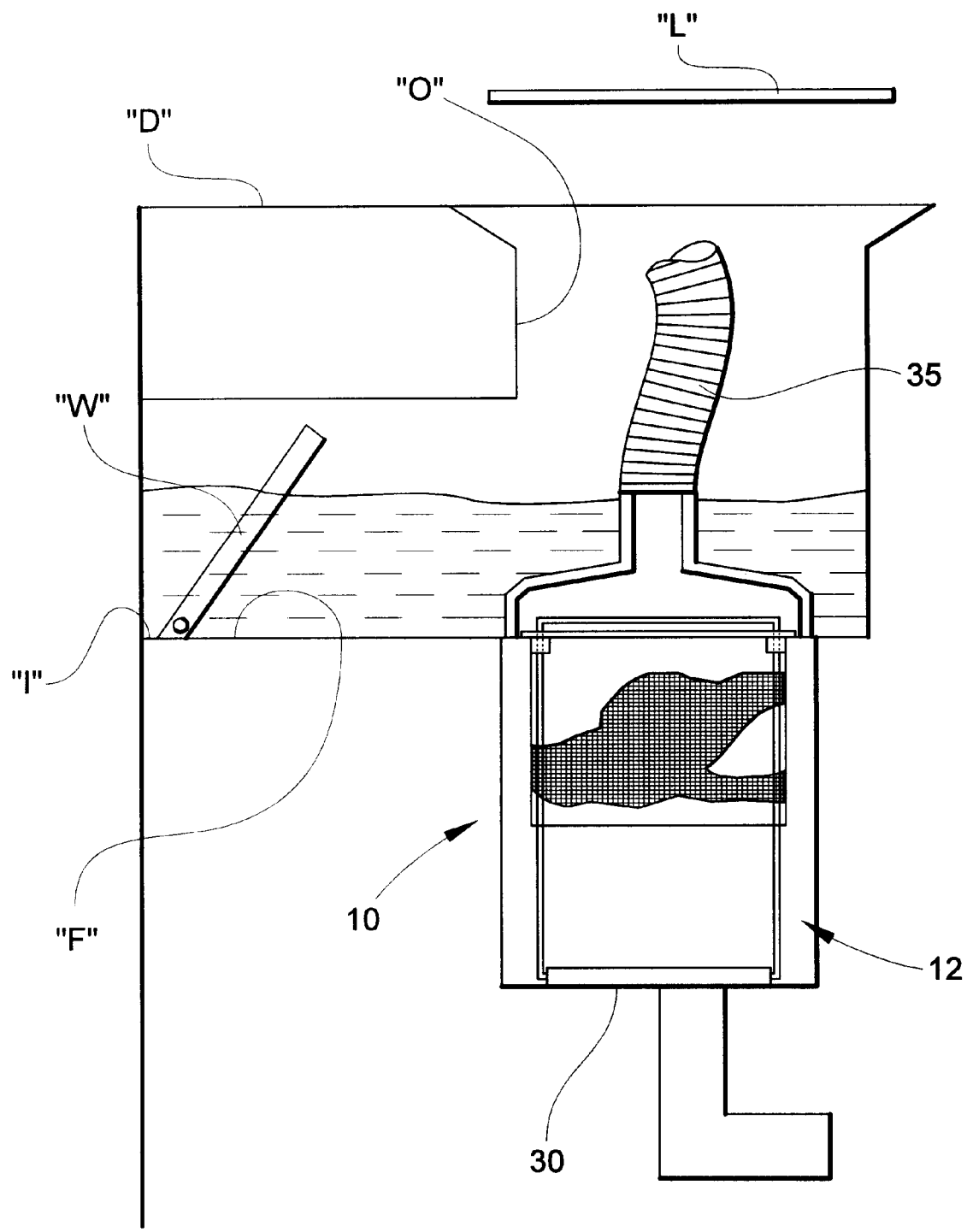
FIG. 5 is an elevational view of the skimmer basket with the grip portion of the handle in the lowered position and a vacuum hose attached over the top of the basket.

FIG. 5 illustrates a further application of the invention. By moving the handle 12 to the lowered position, a vacuum hose 35 readily attaches over the open top 14 of the skimmer basket 11 without obstruction or interference from the float 30.

Figure 6:
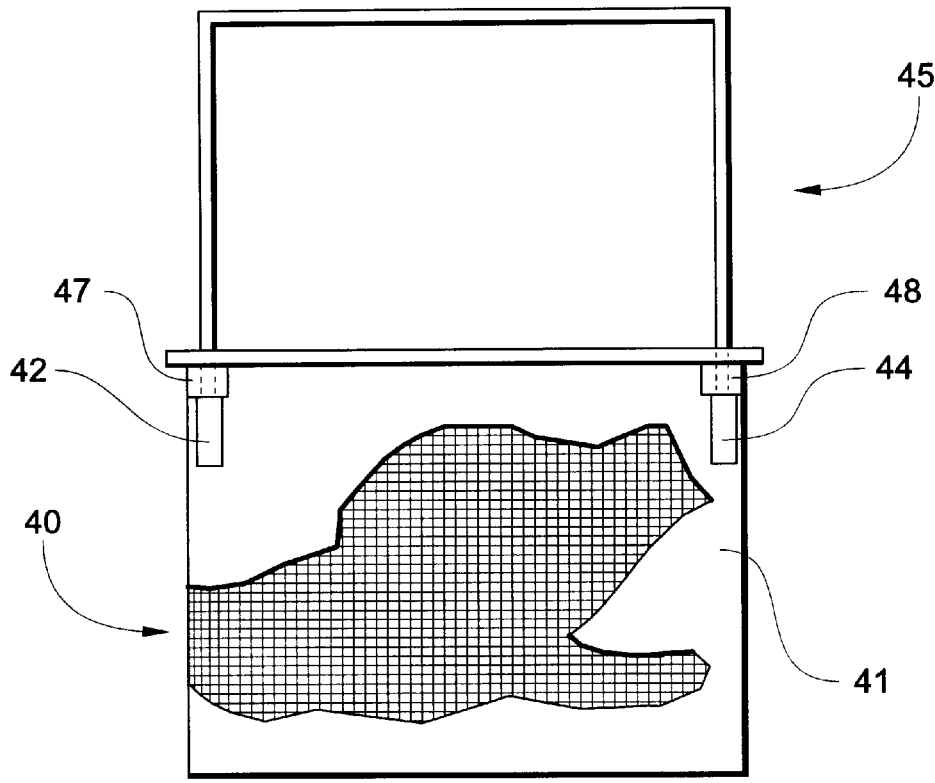
FIGS. 6 and 7 are elevational views of the skimmer basket according to a second preferred embodiment of the invention and showing the grip portion of the handle in the raised and lowered position, respectively.
Figure 7:
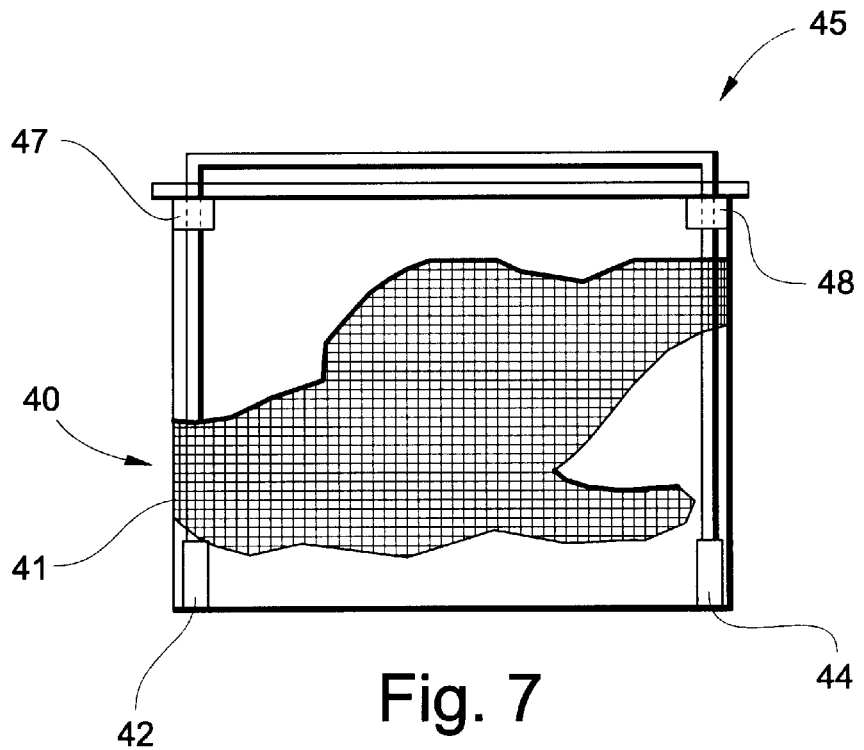

FIGS. 6 and 7 illustrate a second embodiment of a skimmer basket assembly 40 according to the present invention. The assembly 40 includes a skimmer basket 41 with an open top and rigid walls having a grid-like structure. Floats 42 and 44 are attached to respective free ends of a generally C-shaped handle 45. The floats 42 and 44 reside inside the basket 41 closely adjacent the cylindrical side wall 46, and engage the rigid sleeves 47 and 48 upon movement of the grip portion of the handle 45 to the raised position shown in FIG. 6.

Figure 8:
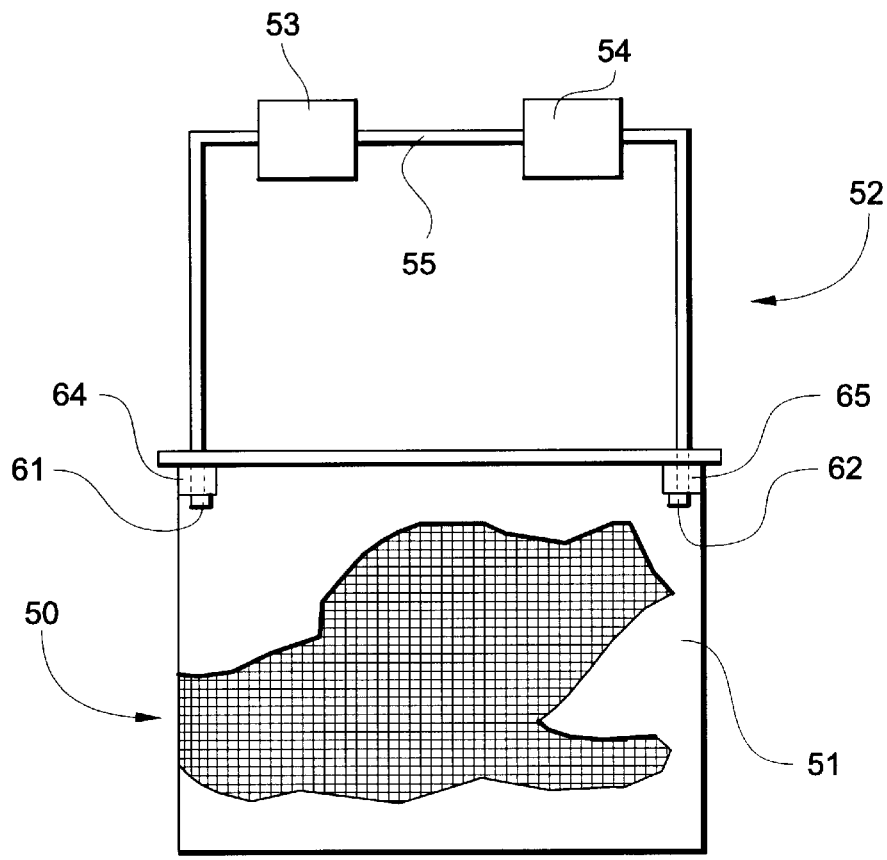
FIGS. 8 and 9 are elevational views of the skimmer basket according to a third preferred embodiment of the invention and showing the grip portion of the handle in the raised and lowered position, respectively.
Figure 9:
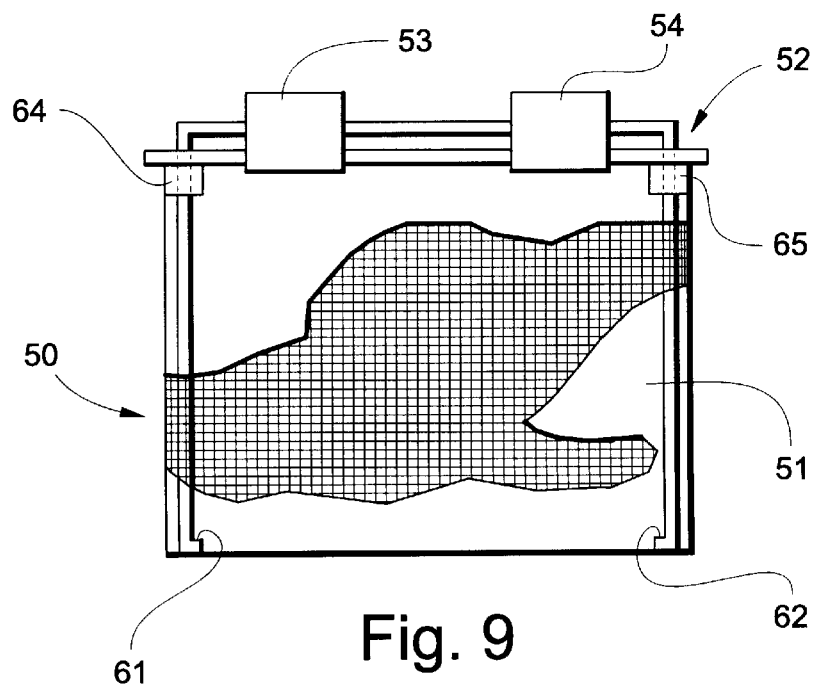

FIGS. 8 and 9 illustrate a third embodiment of a skimmer basket assembly 50 according to the present invention.

According to this embodiment, the basket 51 includes side and bottom walls having a rigid grid-like structure, an open top, and a generally C-shaped handle 52 for carrying the basket 51. One or more floats 53 and 54 are secured to the horizontal member of the handle 52. The free ends of the handle 52 are bent to form respective stoppers 61 and 62 which engage the sleeves 64 and 65 with the horizontal member of the handle 52 in the raised position shown in FIG. 8.

Figure 10:
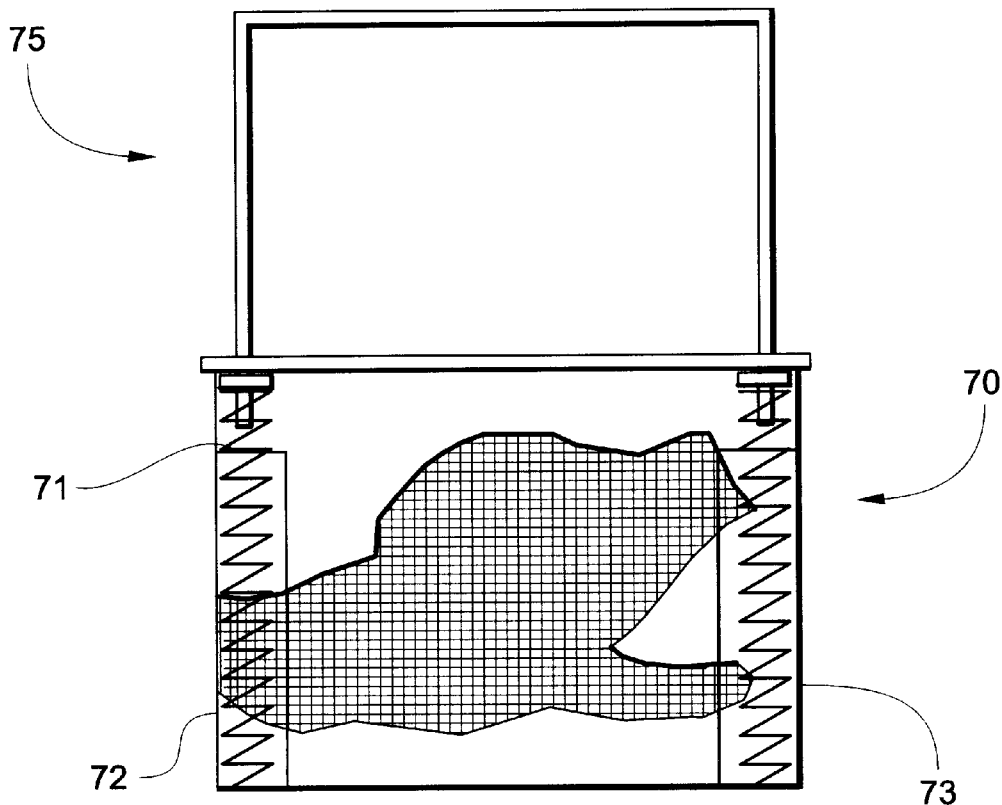
FIGS. 10 and 11 are elevational views of the skimmer basket according to a fourth preferred embodiment of the invention and showing the grip portion of the handle in the raised and lowered position, respectively.
Figure 11:
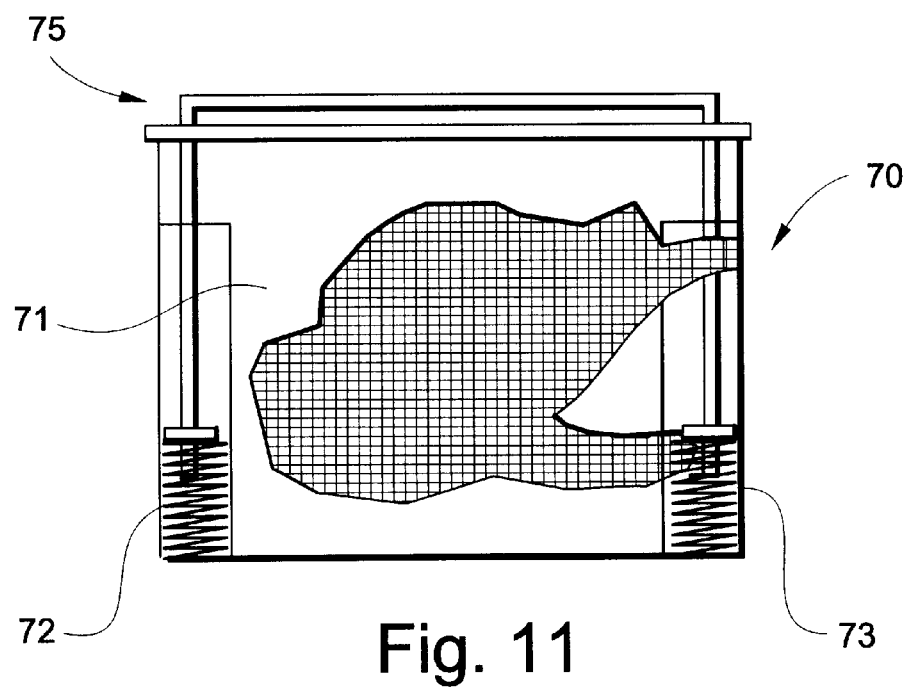

A fourth embodiment of the invention is shown in FIGS. 10 and 11. According to this embodiment, the basket assembly 70 includes a skimmer basket 71 with side and bottom walls having a rigid grid-like structure, and an open top. Compression springs 72 and 73 are located in respective side openings formed on the interior of the basket 71. The springs 72 and 73 engage the ends of the handle 75 and normally urge the handle 75 upwardly to locate its grip portion in the raised position, shown in FIG. 10, for ready access by the pool cleaner. In order to connect the vacuum hose, as discussed above, the handle 75 is moved downwardly to locate the grip portion in the lowered position, shown in FIG. 11, by compressing the springs 72 and 73.

In still another embodiment (not shown), a cord or chain may be attached to the horizontal portion of the handle and to the underside of the lid covering the access opening in the pool deck. Upon removal and lifting of the lid, cord or chain would move the handle to the raised position for ready access to the pool cleaner. The filter means may include one or more separate filters removably positioned within the interior of the basket.

A pool skimmer basket including a buoyant handle is described above. Various details of the invention may be changed without departing from its scope. Furthermore, the foregoing description of the preferred embodiment of the invention and the best mode for practicing the invention are provided for the purpose of illustration only and not for the purpose of limitation.

I claim:

1. A pool skimmer basket assembly for being submerged in a filter passage communicating with a filter opening formed in a wall of a pool to separate and capture debris entrained in pool water entering the filter opening and moving downstream through the filter passage, and said skimmer basket assembly being accessible through a user access opening communicating with the filter passage, such that said skimmer basket assembly is readily removable by a user for periodic emptying and cleaning, said skimmer basket assembly comprising:
   (a) a basket defined by walls and having an open top arranged for receiving pool water therethrough;
   (b) filter means for separating debris from pool water flowing downstream through the filter passage and through the open top of said basket;
   (c) extendable handle means attached to said basket for being grasped by the user to lift and remove said basket outwardly from the filter passage through the access opening; and
   (d) a float attached to said extendable handle means for locating said handle means in a position within the filter passage for ready access by the user.

2. A pool skimmer basket assembly according to claim 1, wherein said filter means comprises one or more basket walls having a grid structure defining openings sufficient to permit passage of pool water therethrough while capturing debries entrained in the pool water.

3. A pool skimmer basket assembly according to claim 1, wherein said extendable handle means comprises a generally U-shaped handle having a horizontal member for being grasped by the user, and first and second opposing vertical members secured to said basket.

4. A pool skimmer basket assembly according to claim 3, wherein said basket includes first and second opposing sleeves for slidably receiving respective first and second vertical members of said handle, such that the horizontal member of said handle is movable relative to said basket between a lowered position adjacent the open top of said basket and a raised position spaced-apart from the open top of said basket.

5. A pool skimmer basket assembly according to claim 4, wherein the first and second vertical members of said handle have respective free ends bent to form respective stoppers adapted for engaging the sleeves of said basket to prevent removal of said handle from said basket.

6. A pool skimmer basket assembly according to claim 3, wherein said float is attached to the horizontal member of said handle.

7. A pool skimmer basket assembly according to claim 3, wherein said float is attached to at least one of the vertical members of said handle.

8. A pool skimmer basket assembly according to claim 1, wherein said handle means comprises a handle having spaced-apart top and bottom horizontal members, and first and second spaced-apart vertical members interconnecting said horizontal members, said top horizontal member adapted for being grasped by the user and said bottom horizontal member adapted for engaging a bottom of the basket when the basket is lifted and removed from the filter passage.

9. A pool skimmer basket assembly according to claim 8, wherein said basket includes first and second opposing sleeves for slidably receiving respective first and second vertical members of said handle, such that the top horizontal member of said handle is movable relative to said basket between a lowered position adjacent the open top of said basket and a raised position spaced-apart from the open top of said basket.

10. A pool skimmer basket assembly according to claim 9, wherein said float is attached to the bottom horizontal member of said handle.

\* \* \* \* \*